(12) United States Patent
Moriwaki

(10) Patent No.: US 10,803,368 B2
(45) Date of Patent: Oct. 13, 2020

(54) IMAGE DECOMPRESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Daisaku Moriwaki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/569,812

(22) Filed: Sep. 13, 2019

(65) Prior Publication Data

US 2020/0090014 A1    Mar. 19, 2020

(30) Foreign Application Priority Data

Sep. 18, 2018 (JP) ................................ 2018-174190

(51) Int. Cl.
*G06K 15/00* (2006.01)
*G06K 15/02* (2006.01)

(52) U.S. Cl.
CPC ..... *G06K 15/1856* (2013.01); *G06K 15/1886* (2013.01)

(58) Field of Classification Search
None
See application file for complete search history.

(56) References Cited

U.S. PATENT DOCUMENTS

| 8,229,235 | B2* | 7/2012 | Kim | H04N 19/176 |
| | | | | 382/234 |
| 8,392,596 | B2* | 3/2013 | Kamay | H04N 19/503 |
| | | | | 709/217 |
| 9,928,452 | B2* | 3/2018 | Nagashima | G06K 15/184 |
| 2008/0069457 | A1 | 3/2008 | Matsumoto | |

(Continued)

FOREIGN PATENT DOCUMENTS

| JP | H10322216 A | 12/1998 |
| JP | 2000050084 A | 2/2000 |
| JP | 2004236226 A | 8/2004 |

OTHER PUBLICATIONS

Extended European Search Report issued in European Appln. No. 19195066.6 dated Feb. 13, 2020.

*Primary Examiner* — Henok Shiferaw
(74) *Attorney, Agent, or Firm* — Rossi, Kimms & McDowell LLP

(57) ABSTRACT

A decompressing apparatus comprises a first decompressing unit, a second decompressing unit which can decompresses encoded data that the first decompressing unit does not support, an identifying unit which identifies a type of each encoded block, a generating unit which, if encoded block of interest is a type that can be decompressed by the first decompressing unit, stores the encoded data in a memory, and, if not, stores predetermined encoded data that can be decompressed by the first decompressing unit in the memory, and control unit which controls the first decompressing unit to decompress the encoded data in the memory to generate tentative image data, then controls the second decompressing unit to decompress the encoded data that cannot be decompressed by the first decompressing unit, and updates the tentative image data with the decompression result.

22 Claims, 9 Drawing Sheets

(56) References Cited

U.S. PATENT DOCUMENTS

| | | | |
|---|---|---|---|
| 2011/0026819 A1* | 2/2011 | Lee | H04N 19/147 |
| | | | 382/166 |
| 2011/0075943 A1 | 3/2011 | Minami | |
| 2013/0266235 A1* | 10/2013 | Shima | H04N 19/157 |
| | | | 382/238 |
| 2014/0286587 A1 | 9/2014 | Neubrand | |
| 2016/0358046 A1 | 12/2016 | Nagashima | |

* cited by examiner

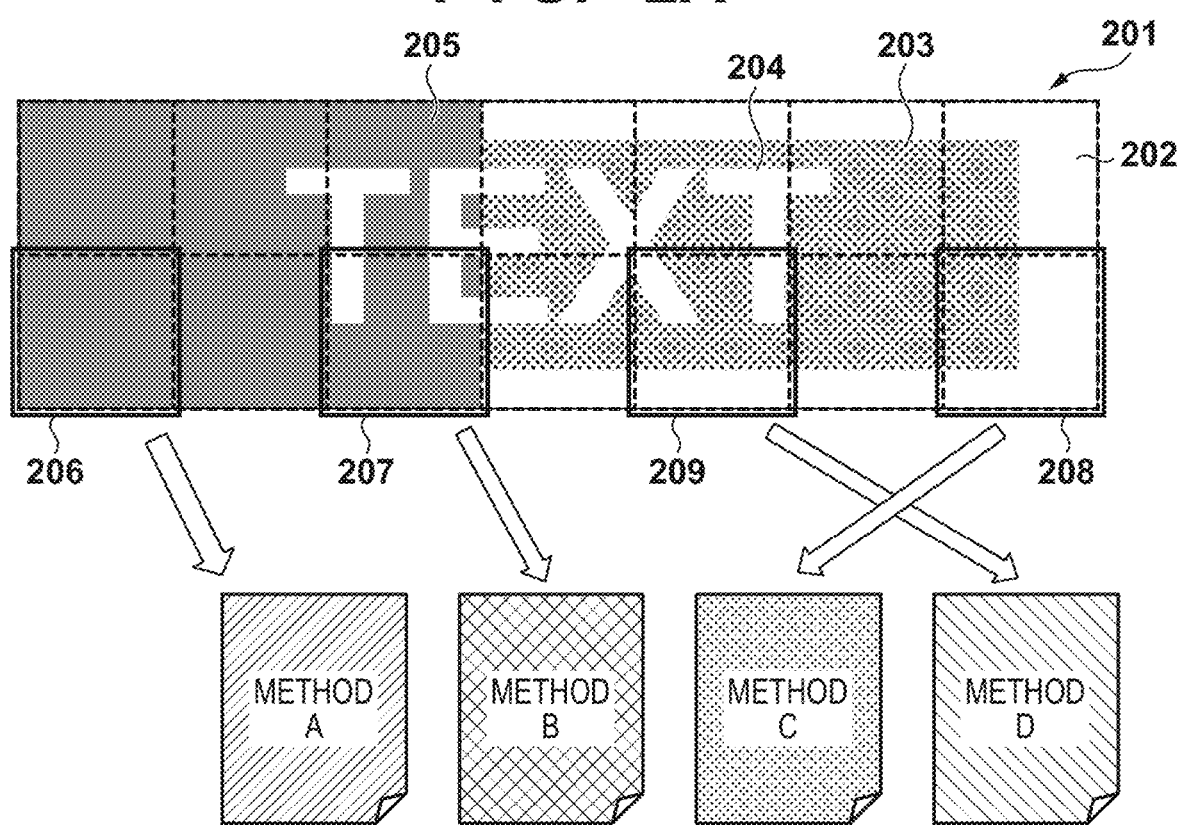

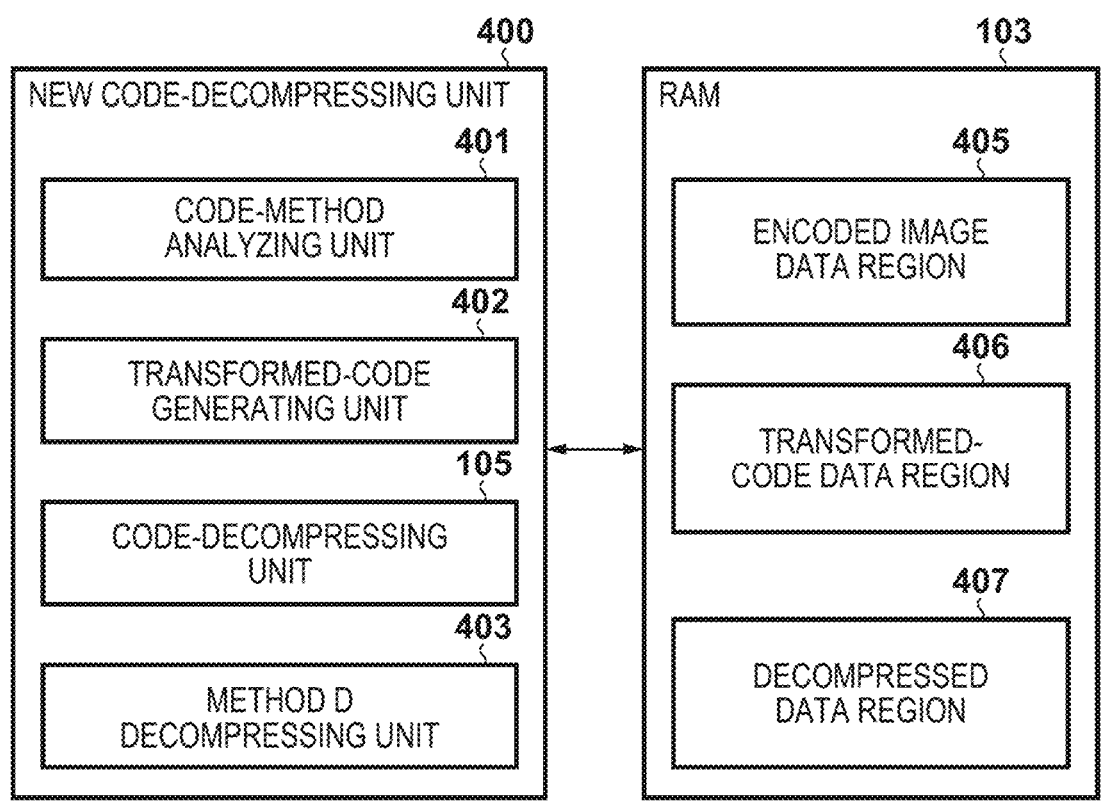

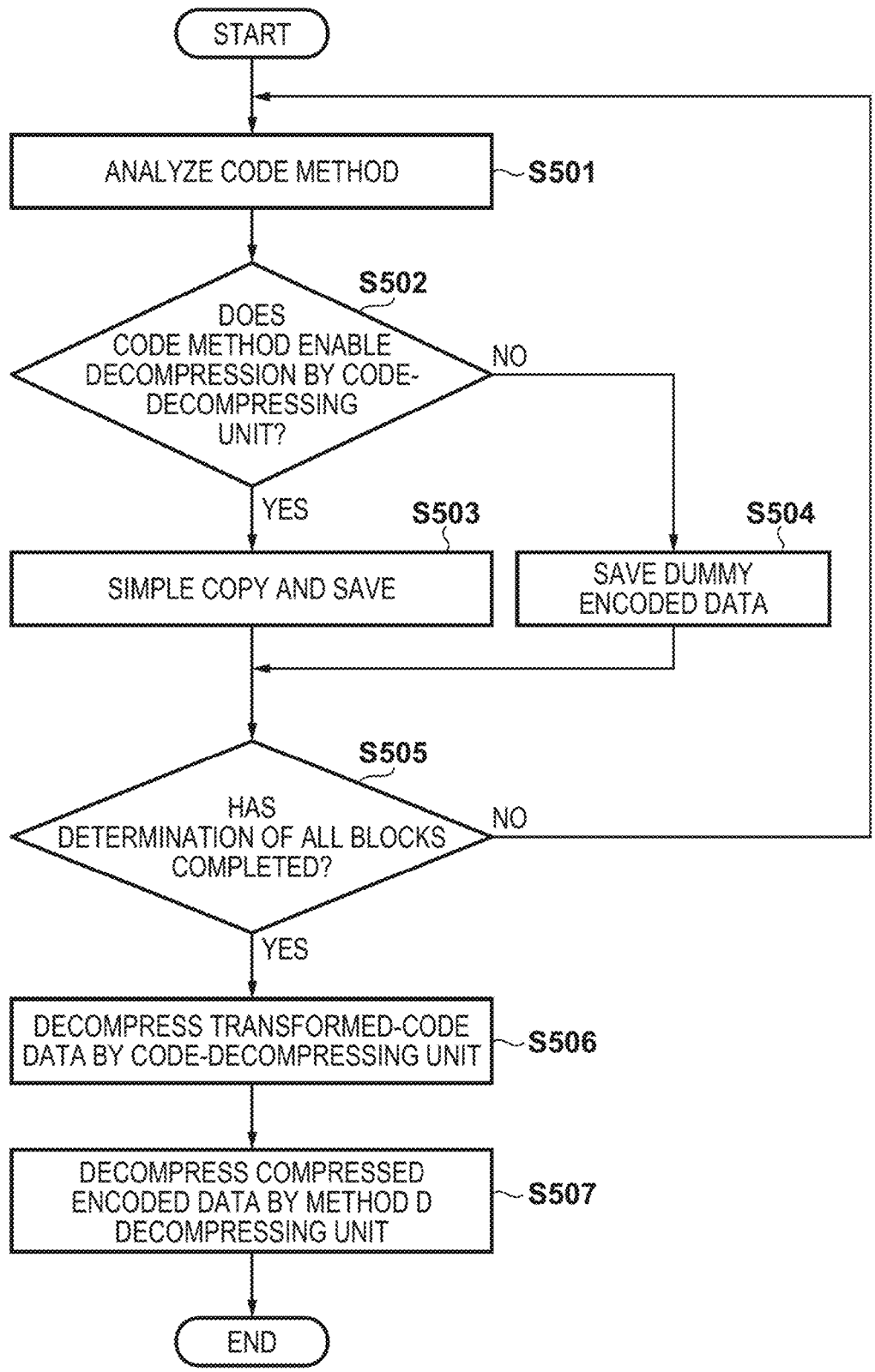

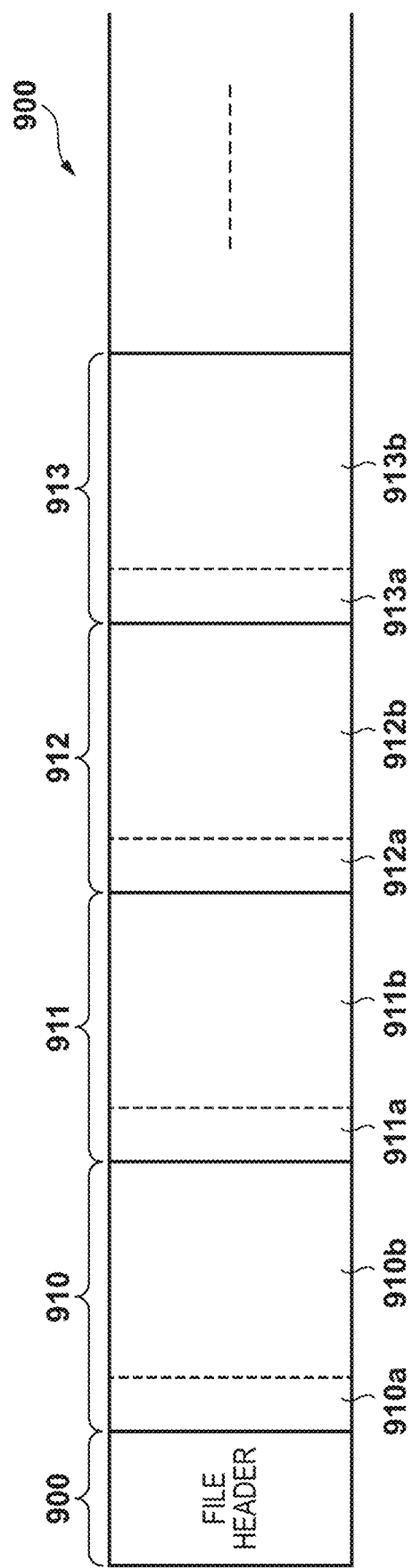

IMAGE DECOMPRESSING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to an image decompressing apparatus, a control method thereof, and a non-transitory computer-readable storage medium.

Description of the Related Art

In recent years, the resolution of a still image or moving image have increased. The higher the resolution of an image is, the larger the data amount of the image is. Hence, to store image data by a less memory resource and implement network transfer in a shorter time, an image compression technique using encoding is important. On the other hand, the image compression technique is required not to deteriorate image quality, and code methods that do not cause deterioration of image quality have continuously been developed.

In general, since a code method that an already sold product supports depends on the technical level at the time of sales, it is difficult to support encoded data of a new format developed after the sales.

In this point, Japanese Patent Laid-Open No. 2004-236226 (to be referred to as literature 1 hereinafter) discloses a technique of acquiring decoding program information included in encoded data and decompressing the encoded data encoded by a new code method in a case in which an image standard is discriminated as a new image standard that cannot be decompressed by an existing decoding program.

Additionally, Japanese Patent Laid-Open No. 10-322216 (to be referred to as literature 2 hereinafter) discloses a technique of, when sending encoded data, notifying that the encoded data uses a new code method, and transmitting the encoded data including the format information of the new code method. Accordingly, a code-decompressing apparatus dynamically changes its operation using the new format information, thereby performing decompression for the new code method.

As another technique, a method is known in which a portion detected as encoded data encoded by a new code method is processed by a processor, and encoded data encoded by a conventional code method is processed by a code-decompressing apparatus at a high speed.

In literature 1, the information of the decompressing program of the new method is included in the new encoded data, thereby allowing the decompressing side to decompress the new encoded data. That is, literature 1 assumes that decompression processing of new encoded data is performed by software. For this reason, even if the apparatus includes a decompressing circuit as hardware applied to a preceding method, it cannot be said that the circuit is effectively used.

The technique disclosed in literature 2 assumes a reconstructible hardware arrangement. For this reason, the technique cannot be applied to an apparatus formed by fixed hardware.

SUMMARY OF THE INVENTION

The present invention has been made in consideration of the above problems, and provides a technique of, instead of decompressing new encoded data using only new software, effectively using an existing fixed arrangement concerning decompression and thus suppressing a decrease in speed as compared to support of only the software.

According to a first aspect of the invention, there is provided an image decompressing apparatus for decompressing encoded image data, the apparatus comprising: a first decompressing unit configured to decompress encoded data of a preset type; a second decompressing unit configured to perform decompression processing of encoded data of a type that the first decompressing unit does not support; an identifying unit configured to identify a type of encoded data for each block of input encoded image data; a generating unit configured to, in a case in which a type of encoded data of a block of interest identified by the identifying unit is a type that can be decompressed by the first decompressing unit, store the encoded data of the block of interest in a predetermined memory, and in a case in which the type is a type that cannot be decompressed by the first decompressing unit, store predetermined encoded data that can be decompressed by the first decompressing unit in the memory, thereby generating encoded image data that can be decompressed by the first decompressing unit; and a control unit configured to control the first decompressing unit to decompress the encoded data generated by the generating unit to generate tentative image data, and then controlling the second decompressing unit to decompress the encoded data that cannot be decompressed by the first decompressing unit, and update the tentative image data to the decompression result, thereby generating image data to be output.

According to a second aspect of the invention, there is provided an image decompressing apparatus for decompressing encoded image data, the apparatus comprising: a first decompressing unit configured to decompress encoded data of a preset type on a block basis; a second decompressing unit configured to decompress encoded data of a block in which encoded data of a plurality of types coexist; an identifying unit configured to identify a type of encoded data for each block of input encoded image data; a generating unit configured to, in a case in which a type of encoded data of a block of interest identified by the identifying unit is a single type that can be decompressed by the first decompressing unit, store the encoded data of the block of interest in a predetermined memory, and in a case in which encoded data of a plurality of types that cannot be decompressed by the first decompressing unit are included, store encoded data of a single type in the encoded data of the block of interest, which can be decompressed by the first decompressing unit, in the predetermined memory as the encoded data of the block of interest, thereby generating encoded image data that can be decompressed by the first decompressing unit; and a control unit configured to control the first decompressing unit to decompress the encoded data generated by the generating unit and generate tentative image data, then controls the second decompressing unit to decompress the encoded data of a remaining type that cannot be decompressed by the first decompressing unit, and update the tentative image data to the decompression result, thereby generating image data to be output.

According to a third aspect of the invention, there is provided a control method of an image decompressing apparatus for decompressing encoded image data, the method comprising: a first decompressing step of decompressing encoded data of a preset type; a second decompressing step of performing decompression processing of encoded data of a type that the decompressing does not support; an identifying step of identifying a type of encoded data for each block of input encoded image data; a generating step of, in a case in which a type of encoded data of a block of interest identified in the identifying step is a type that can be decompressed in the first decompressing step, storing the encoded data of the block of interest in a predetermined memory, and in a case in which the type is a type that cannot be decompressed in the first decompressing step, storing predetermined encoded data that can be decompressed in the first decompressing step in the predetermined memory, thereby generating encoded image data that can be decompressed in the first decompressing step; and a controlling step of controlling the decompressing to decompress the encoded data generated in the first generating step to generate tentative image data, and then controlling the second decompression step to decompress the encoded data that cannot be decompressed in the first decompressing step, and update the tentative image data to the decompression result, thereby generating image data to be output.

According to a fourth aspect of the invention, there is provided a control method of an image decompressing apparatus for decompressing encoded image data, the method comprising: a first decompressing step of decompressing encoded data of a preset type on a block basis; a second decompressing step of decompressing encoded data of a block in which encoded data of a plurality of types coexist; an identifying step of identifying a type of encoded data for each block of input encoded image data; a generating step of, in a case in which a type of encoded data of a block of interest identified in the identifying step is a single type that can be decompressed in the first decompressing step, storing the encoded data of the block of interest in a predetermined memory, and in a case in which encoded data of a plurality of types that cannot be decompressed in the first decompressing step are included, storing encoded data of a single type in the encoded data of the block of interest, which can be decompressed in the first decompressing step, in the predetermined memory as the encoded data of the block of interest, thereby generating encoded image data that can be decompressed in the first decompressing; and controlling the first decompressing step to decompress the encoded data generated in the generating step to generate tentative image data, then controlling the second decompressing step to decompress the encoded data of a remaining type that cannot be decompressed in the first decompressing step, and updating the tentative image data to the decompression result, thereby generating image data to be output.

According to a fifth aspect of the invention, there is provided a non-transitory computer-readable storage medium storing a program which, when read and executed by a computer, causes the computer to execute the steps of the above methods.

According to the present invention, instead of decompressing new encoded data using only new software, it is possible to effectively use an existing fixed arrangement concerning decompression and thus suppress a decrease in speed as compared to support of only the software.

Further features of the present invention will become apparent from the following description of exemplary embodiments (with reference to the attached drawings).

BRIEF DESCRIPTION OF THE DRAWINGS

FIGS. 2A and 2B are views for explaining a state in which image data is encoded on a block basis using one of a plurality of types of code methods;

FIG. 4 is a view showing the relationship between a RAM and the arrangement of a new code-decompressing unit according to the first embodiment;

FIG. 5 is a flowchart showing processing of the new code-decompressing unit according to the first embodiment;

FIG. 9 is a view showing an example of the data structure of received encoded data.

DESCRIPTION OF THE EMBODIMENTS

Embodiments of the present invention will now be described in detail with reference to the accompanying drawings. Note that the arrangements in the embodiments to be described below are merely examples, and the present invention is not limited to the illustrated arrangements.

Figure 1:
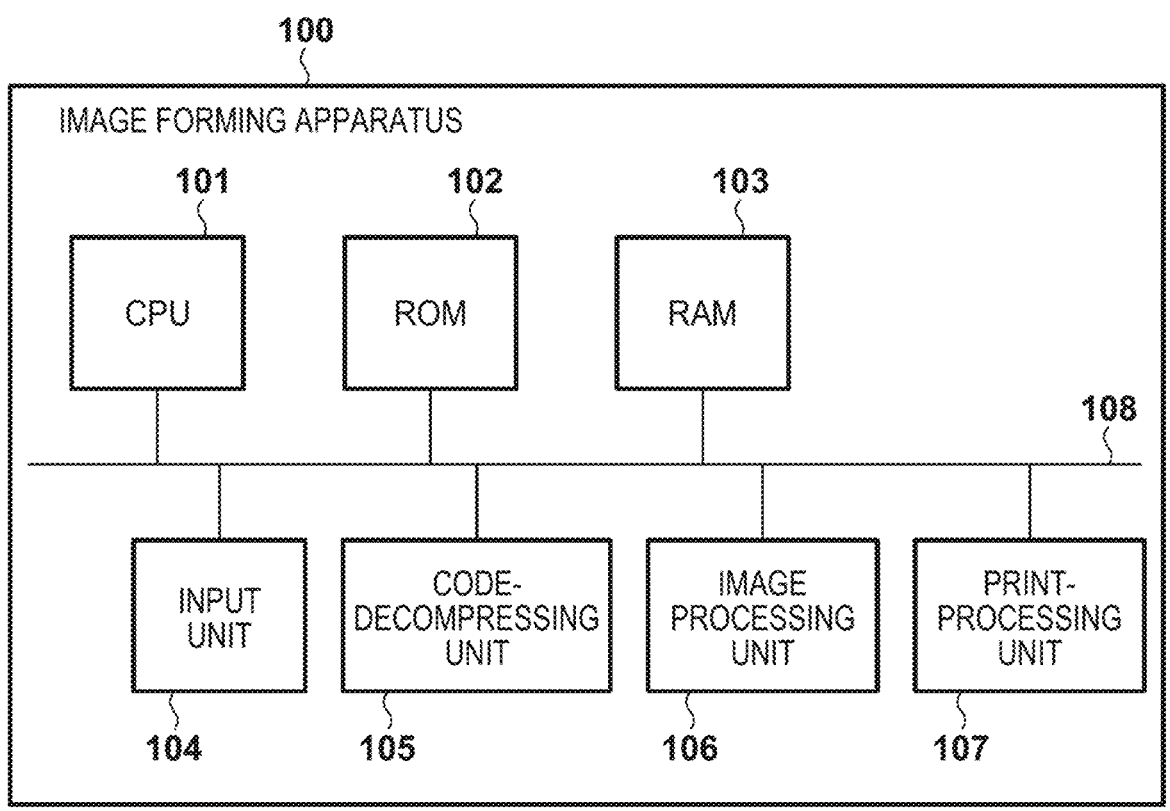
FIG. 1 is a block diagram of an image forming apparatus to which the first embodiment is applied.

FIG. 1 is a block diagram of an image forming apparatus 100 to which an image decompressing apparatus (image decoding) according to the first embodiment is applied. The image forming apparatus 100 includes a CPU 101, a ROM 102, a RAM 103, an input unit 104, a code-decompressing unit 105, an image processing unit 106, and a print-processing unit 107, and these are connected to each other by an internal bus 108.

The ROM 102 is a rewritable nonvolatile memory, and addition and change of stored control programs are possible. The CPU 101 reads out a control program stored in the ROM 102 and executes it, thereby generally controlling arithmetic processing or the operations of the units in the code-decompressing apparatus. Note that the ROM 102 can be of any type as long as it is rewritable, and can be a flash memory, an EEPROM, or the like. The RAM 103 is a readable/writable memory, and is a storage medium used to temporarily store various kinds of data such as image data. The input unit 104 receives encoded image data transferred from a host PC or a server (not shown), and stores it in the RAM 103. The code-decompressing unit 105 decompresses (decodes) encoded image data of a predetermined type, which is received by the input unit 104 and stored in the RAM 103, thereby generating image data before compression. The image processing unit 106 performs conversion (RGB→YMCK conversion and halftone processing) of the image data obtained by the decompression processing of the code-decompressing unit 105 into image data suitable for the characteristic of the print-processing unit 107, and converts the image data into the input data format of the print-processing unit 107, thereby generating print data. The print-processing unit 107 forms an image on a print medium (print paper) based on the print data that is electronic information. Image formation according to the embodiment is of a type of discharging an ink liquid onto a print medium, but may be of a type using toner, like an electrophotographic method. The image formation method is not particularly limited.

The CPU 101 updates a control program stored in the ROM 102, thereby executing a new control program. Such updating to a new program is performed in accordance with the following procedure. The image forming apparatus 100 receives a new control program from a host PC or a server (not shown) via the input unit 104 in a format identifiable from normal print data, and saves the control program in the RAM 103. Then, the CPU 101 executes a rewrite program stored at a preset address position (an address position not to be rewritten) in the ROM 102, thereby overwriting the received new control program on the ROM 102. When the overwrite is completed, the CPU 101 temporarily performs resetting and executes the overwritten new control program, thereby performing image decompression or image formation processing in accordance with the updated control program in the image forming apparatus 100.

Generally, when encoding image data, a method of dividing the image data into a plurality of image data of rectangular blocks (or tiles), selecting a suitable code method in accordance with the features of the image data of each rectangular block, and encoding the image data is often used. Here, as for the features of the image data of a rectangular block, for example, features such as the number of colors appearing in the block and whether many pixels of similar colors are included as in a natural image are used to select a code method. These features are analyzed for each rectangular block, and a code method of higher encoding efficiency is selected.

FIG. 2A is a view showing an example in which image data is encoded by a plurality of code methods. Adaptively selecting the plurality of code methods in accordance with the features of an image will be explained with reference to FIG. 2A.

Reference numeral 201 denotes image data of an encoding target. Here, image data of one page has a size of 448 pixels in the horizontal direction×128 pixels in the vertical direction (the horizontal/vertical relationship will simply be referred to as 448×128 pixels hereinafter). The image 201 is divided into rectangular blocks each formed by 64×64 pixels. Then, the image 201 is divided into 7×2 rectangular blocks, as shown in FIG. 2A. Note that as for the size of an image and the size of one block, detailed examples are shown each for understanding, and the sizes are not limited to these numerical values.

Here, assume that a white background portion denoted by reference numeral 202 is a background region, a hatched portion denoted by reference numeral 203 is a natural image region, reference numeral 204 denotes a text region drawn in a single color, and reference numeral 205 denotes a graphic region of a single color.

Reference numerals 206 to 209 denote rectangular blocks of the respective types of the image. The image of the rectangular block 206 is formed only by a graphic region of a single color, and is therefore encoded by a method A that is a lossless code method (reversible encoding) suitable for encoding of a single color region.

The image of the rectangular block 207 is divided into regions of a plurality of colors, but the number of types of appearing colors is small. Hence, the rectangular block 207 is preferably encoded by a method B that is a lossless code method. In the method B, encoding is performed using a run length code method that is a method of performing compression by encoding the number of pixels in which the same color continues. Alternatively, a palette code method that uses a palette table in which a predetermined number of colors are registered and encodes the index of the table may be used.

The image of the rectangular block 208 is formed by a background region where no object exists and a natural image region, and is therefore encoded using a method C using a JPEG method that is a lossy code (irreversible coding) method capable of performing efficient compression while suppressing deterioration of the quality of a natural image. The code method used in the method C may be a method such as, for example, JPEG 2000 other than JPEG.

The image of the rectangular block 209 is an image in which a natural image region and a text region coexist. If the method C is used for an image of such a feature, image degradation is unnoticeable in the natural image region because the method C is a lossy code method using the JPEG method. In the text region, however, image degradation such as a blurred edge is noticeable. For this reason, the image is encoded by a method D that is a code method having the data structures of the two methods B and C, in which the text region is encoded using the method B that is the lossless code method, and the natural image region is encoded using the method C that is the lossy code method.

As described above, an optimum code method is selected in accordance with the feature of each rectangular image, and the image is encoded by the method. FIG. 2B shows the relationship between the 7×2 rectangular blocks and the code methods therefor.

FIG. 9 shows the data structure of encoded image data 900 received from the outside, which corresponds to the encoded data shown in FIG. 2B. The encoded data 900 has a structure including a file header 901 and blocks 910, 911, 912, 913 . . . next to the file header 901. The file header 901 stores pieces of information necessary for decompression such as the number of bits of one pixel, the type of the color space of the image data, and information representing that the image is formed by 7×2 blocks. The order of the blocks 910, 911 . . . , is the raster scan order of the blocks shown in FIG. 2B. Hence, the encoded data of the block 910 corresponds to the rectangular block at the upper left corner in FIG. 2B. The encoded data of the block 910 is formed by a block header 910a and encoded data 910b that is a payload. The block header 910a includes various kinds of control information such as an identification bit that specifies that the corresponding block is encoded by the "method A", and information representing that the block is formed by 64×64 pixels. This also applies to the remaining blocks 911, 912, 913 . . . . Note that the information representing that one block is formed by 64×64 pixels may be stored in the file header.

The code-decompressing unit 105 according to the embodiment is assumed to be able to decompress encoded data of the methods A, B, and C but unable to decompress the encoded data of the method D. That is, the code-decompressing unit 105 is assumed to support the methods A, B, and C but not the method D.

In this embodiment, the control program in the ROM 102 is updated, thereby correctly decompressing the encoded data 900 shown in FIG. 2B or 9.

Figure 3A:
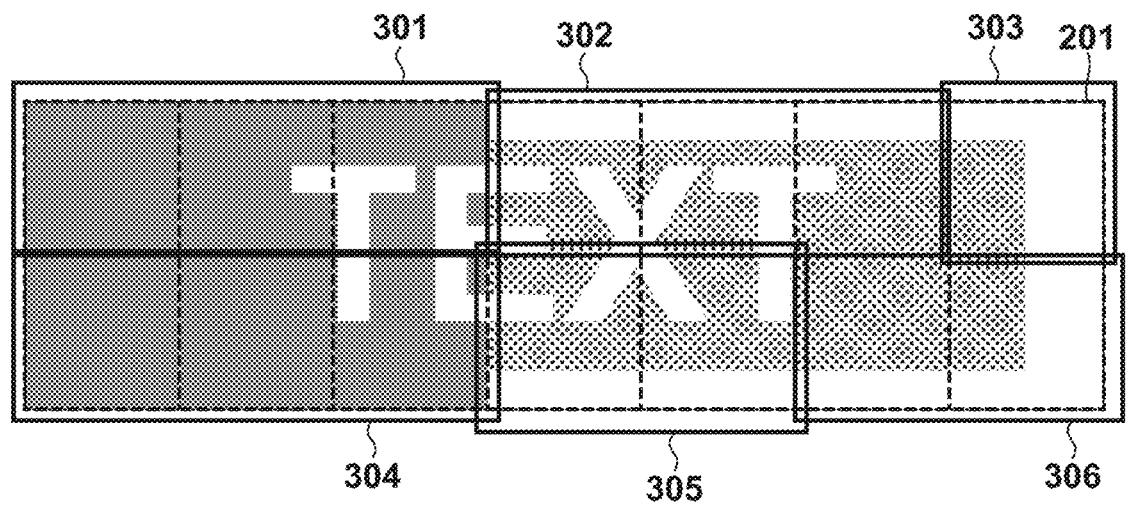
FIGS. 3A and 3B are views for explaining a method of switching decompression processing while discriminating a code method.
Figure 3B:
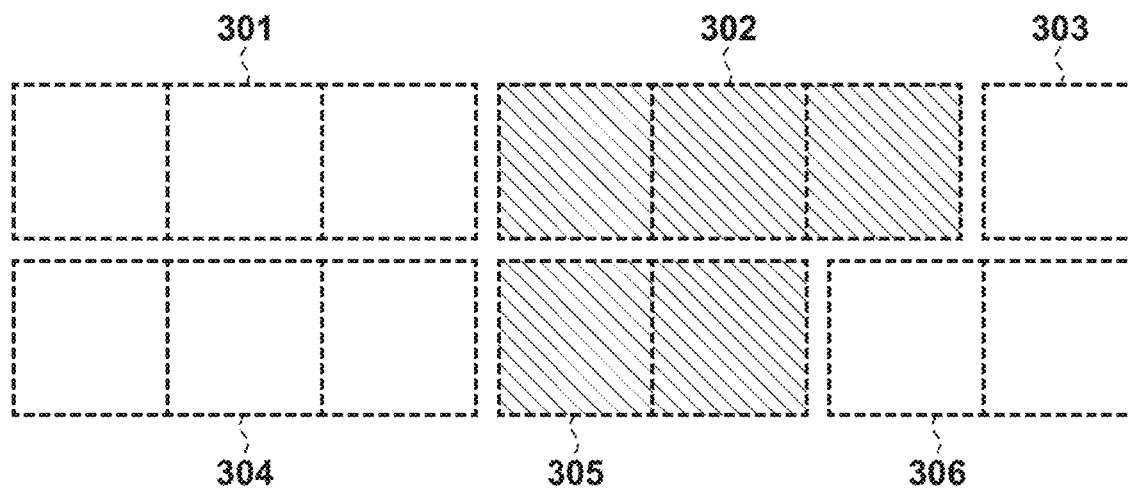

Decompression processing at this time will be described first with reference to FIGS. 3A and 3B. Rectangular regions 301 to 306 are processing units to be subjected to decompression processing by the CPU 101 or the code-decompressing unit 105. FIG. 3A shows the image 201 and the rectangular regions 301 to 306 in a superimposed manner. FIG. 3B is a schematic view showing an example in which the image 201 is divided into the rectangular regions 301 to 306 and processed. The hatched rectangular regions are the regions of the code method D, which cannot directly be decompressed by the code-decompressing unit 105.

Overhead that is generated when the decompression processing is switched will be described first with reference to FIGS. 3A and 3B.

In general, processing performance in a case in which decompression is performed by executing a decompression program by a processor is often much lower than the processing performance of the code-decompressing unit 105 formed by a hardware decoder. For this reason, the encoded data of the image 201 encoded for each rectangular block is analyzed on a rectangular block basis to discriminate the code method, thereby discriminating whether the encoded data can be decompressed by the code-decompressing unit 105. In accordance with the discrimination result, only a portion that cannot be decompressed by the code-decompressing unit 105 is decompressed by the CPU 101 using the decompression program. Accordingly, the processing amount of the encoded data undergoing the decompression processing by the decompression program that needs a long processing time can be a minimum necessary amount.

The rectangular region 301 shown in FIG. 3B is a region including three rectangular blocks. The three rectangular blocks are compressed by the code method A or B, as described with reference to FIGS. 2A and 2B. These are regions that can be decompressed by the code-decompressing unit 105, and can be decompressed at a high speed.

The rectangular region 302 is a region including three rectangular blocks, and is encoded by the new method D. Hence, the rectangular region 302 is a region that needs to be decompressed by executing the decompression program by the CPU 101.

The rectangular region 303 is a region including one rectangular block, and is encoded by the code method C. Hence, the rectangular region 303 can be decompressed by the code-decompressing unit 105.

The rectangular region 304 is a region including three rectangular blocks. These rectangular blocks are encoded by the method A or B and can therefore be decompressed by the code-decompressing unit 105.

The rectangular region 305 is a region including two rectangular blocks. These rectangular blocks are encoded by the method D and therefore need to be decompressed by the CPU 101.

The rectangular region 306 is a region including two rectangular blocks, and is encoded by the code method C. Hence, the rectangular region 306 can be decompressed by the code-decompressing unit 105.

In this way, it is necessary to analyze the code method for each rectangular region and execute decompression processing while switching between decompression processing by the code-decompressing unit 105 and decompression processing by the decompression program for each of the six partial regions of the rectangular regions 301 to 306. Generally, for decompression processing of encoded data, control information concerning encoded data to be decompressed and control information concerning output data are necessary. The control information concerning encoded data includes a start address representing where the encoded data is saved on the RAM 103, and an encoded data size, or an end address. The control information concerning output data includes an output address representing where decompressed data is to be output on the RAM 103.

The sequence of processing in a case in which decompression is performed by the code-decompressing unit 105 and the decompression program is as follows.

(1) The region 301 is decompressed by the code-decompressing unit 105.

(2) The region 302 is decompressed by the decompression program.

(3) The region 303 is decompressed by the code-decompressing unit 105.

(4) The region 304 is decompressed by the code-decompressing unit 105.

(5) The region 305 is decompressed by the decompression program.

(6) The region 306 is decompressed by the decompression program.

As described above, the image 201 is divided into six partial regions, and the CPU 101 performs determination processing six times. Then, the pieces of control information as described above need to be calculated and set for each block. For this reason, even if the decompression processing by the decompression program that takes a processing time is limited to minimum necessary regions, the overhead generated at the time of switching between the code-decompressing unit 105 and the decompression program is large, and performance degradation becomes large. In addition, since the encoded data to be decompressed by the code-decompressing unit 105 exist at discontinuous addresses on the RAM 103, the CPU 101 needs to perform setting processing for the code-decompressing unit 105 divisionally a plurality of times. From this viewpoint as well, the processing performance inevitably lowers.

In the first embodiment, by an arrangement shown in FIG. 4, the overhead caused by switching between the decompression program and the code-decompressing unit 105 is eliminated for each encoding unit, and encoded image data is efficiently decompressed.

FIG. 4 is a block diagram showing functional units in a case in which an updated control program in the ROM 102 is executed by the CPU 101, a new code-decompressing unit 400 formed by the existing code-decompressing unit 105, and an example of the structure of data stored in the RAM 103.

A code-method analyzing unit 401, a transformed-code generating unit 402, and a method D decompressing unit 403 in the new code-decompressing unit 400 are functional units implemented by the CPU 101 that executes the updated control program. The code-decompressing unit 105 is hardware originally provided in the image forming apparatus 100 and decompresses encoded data of the methods A, B, and C. In the RAM 103, a received encoded image data region 405, a transformed-code data region 406, and a decompressed data region 407 for output of decompression processing are allocated in advance.

Figure 6:
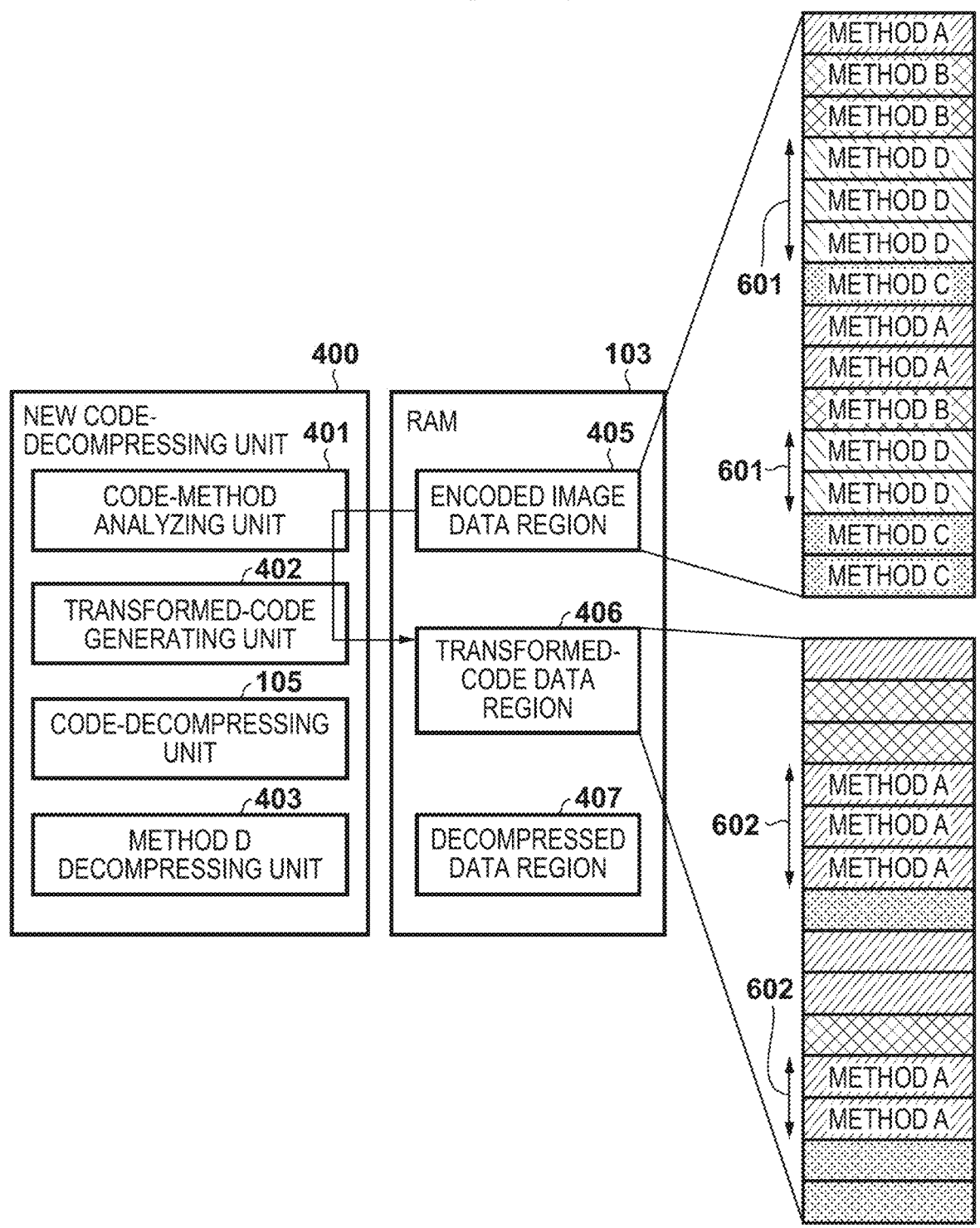
FIG. 6 is a view showing the processing of the new code-decompressing unit and the data structure in the RAM according to the first embodiment.

The operation of the new code-decompressing unit 400 will be described below with reference to the flowchart of FIG. 5 and FIG. 6. FIG. 6 shows the data storage states in the regions 405 to 407 in the RAM 103.

When storage processing of encoded data received from the outside to the encoded image data region 405 of the RAM 103 is ended, the new code-decompressing unit 400 starts the decompression processing.

First, in step S501, the new code-decompressing unit 400 controls the code-method analyzing unit 401 and causes it to analyze the header of one block (to be referred to as a block of interest hereinafter) from the encoded image data region 405 and determine the code method of the block. Next, in step S502, the new code-decompressing unit 400 determines whether the determined code method is a code method (the methods A to C) that enables decompression by the code-decompressing unit 105. In other words, the new code-decompressing unit 400 determines whether the code-decompressing unit 105 according to the embodiment supports decompression of the block of interest or not. Upon determining that the method enables decompression by the code-decompressing unit 105, the new code-decompressing unit 400 advances the process to step S503 to directly copy the encoded data (including the block header) of the block of interest and save it in the transformed-code data region 406.

Upon determining that the encoded data of the block of interest uses the method (method D) that does not enable decompression by the code-decompressing unit 105, the new code-decompressing unit 400 advances the process to step S504. In step S504, the new code-decompressing unit 400 controls the transformed-code generating unit 402 and causes it to save, in the transformed-code data region 406, preset dummy fixed encoded data that can be decompressed by the code-decompressing unit 105. In the embodiment, the dummy fixed encoded data is encoded data of the method A, which is simplest and has the shortest code length.

In step S505, the new code-decompressing unit 400 determines whether the determination processing is ended for all blocks. If NO, the process returns to step S501.

When the code determination processing of all blocks is ended in the above-described way, the encoded data of only the methods A to C are stored in the transformed-code data region 406 continuously in the block order. That is, in appearance, the encoded data of the formats that enable decompression by the code-decompressing unit 105 are stored in the transformed-code data region 406 continuously in the block order.

Hence, in step S506, the new code-decompressing unit 400 causes the code-decompressing unit 105 to perform decompression processing of the encoded data of each block stored in the transformed-code data region 406, and stores the decompressed data as image data in the decompressed data region 407.

Then, after that, the new code-decompressing unit 400 advances the process to step S507. In step S507, the new code-decompressing unit 400 controls the method D decompressing unit 403 and repetitively causes it to decompress encoded data and overwrite obtained block image data on a corresponding block in the decompressed data region 407 as long as the encoded data of the method D stored in the encoded image data region 405 exists.

After that, image processing and print processing are performed for the image data in the decompressed data region 407 by the image processing unit 106.

As described above, according to the first embodiment, even if encoded data of a new code method (in the embodiment, the encoded data of the method D) exists, in the first step, encoded data of continuous blocks that can be decompressed by the code-decompressing unit 105 used so far is constructed and decompressed at once. Then, in the second step, decompression of new encoded data by software is performed. In this way, the overhead caused by switching between decompression processing by the code-decompressing unit 105 and decompression processing by software on a block basis according to the type of encoded data can be eliminated, and the decompression can be performed at a high speed. As a result, it is possible to decrease the delay amount of decompression processing and reduce the delay concerning printing.

Second Embodiment

In the first embodiment, the code-decompressing unit 105 can decompress encoded data of a single type. In the first embodiment, a copy of the encoded data that can be decompressed by the code-decompressing unit 105 is stored in the transformed-code data region 406. As for encoded data of the method D, which cannot be decompressed by the code-decompressing unit 105, dummy fixed encoded data of the method A irrelevant to that is stored in the transformed-code data region 406, thereby constructing encoded data that can be decompressed by the code-decompressing unit 105 for all blocks.

However, instead of storing dummy fixed data in the transformed-code data region 406, encoded data that can be decompressed by the code-decompressing unit 105 may be transformed based on the original encoded data of the method D. This will be described in the second embodiment.

In the second embodiment, considering that the method D is hybrid encoded data that combines two different types of code methods, a transformed-code generating unit 402 transforms encoded data of the method D into the data structure of the code method C that allows a code-decompressing unit 105 to decompress.

Figure 7:
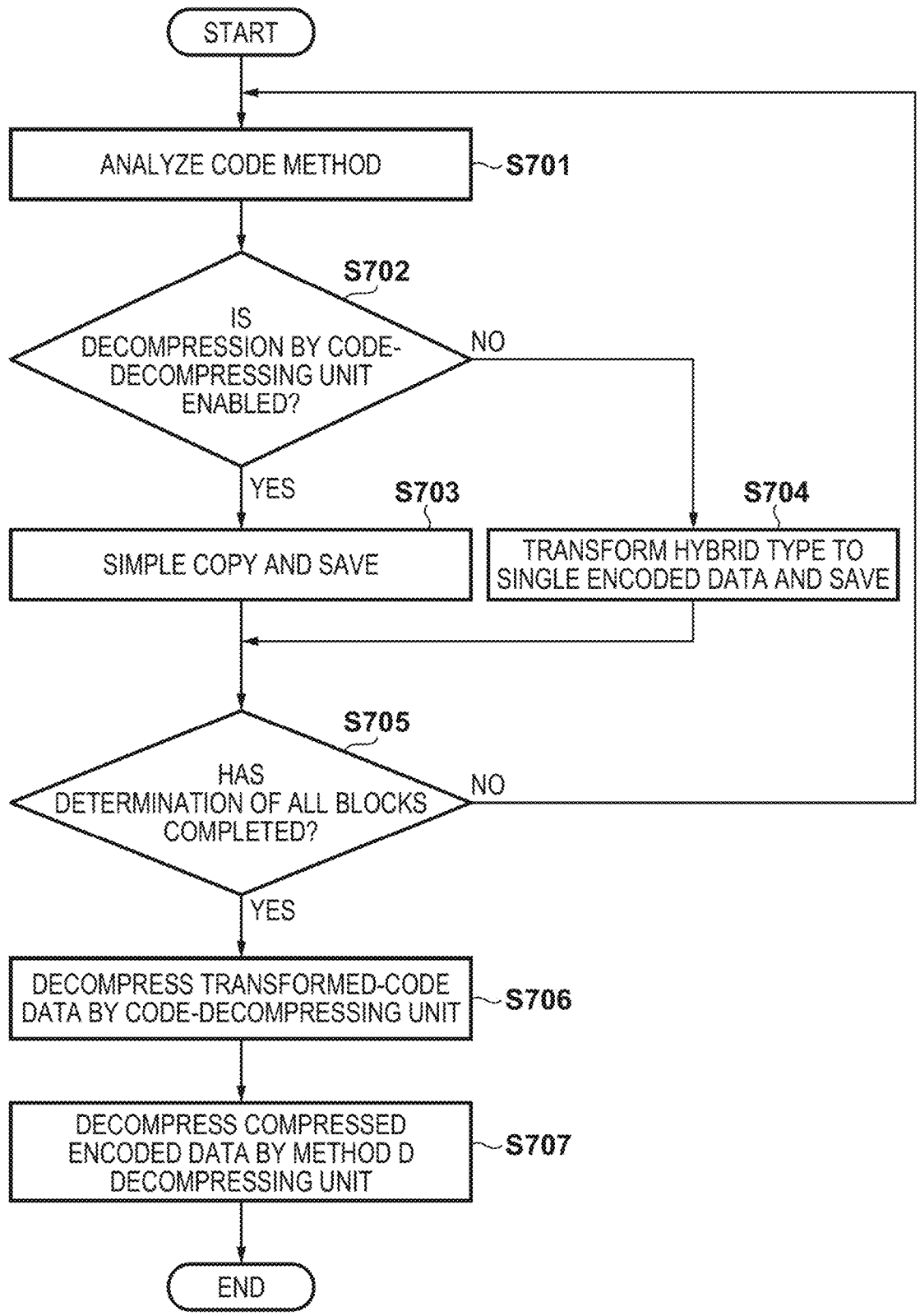
FIG. 7 is a flowchart showing processing of a new code-decompressing unit according to the second embodiment.
Figure 8:
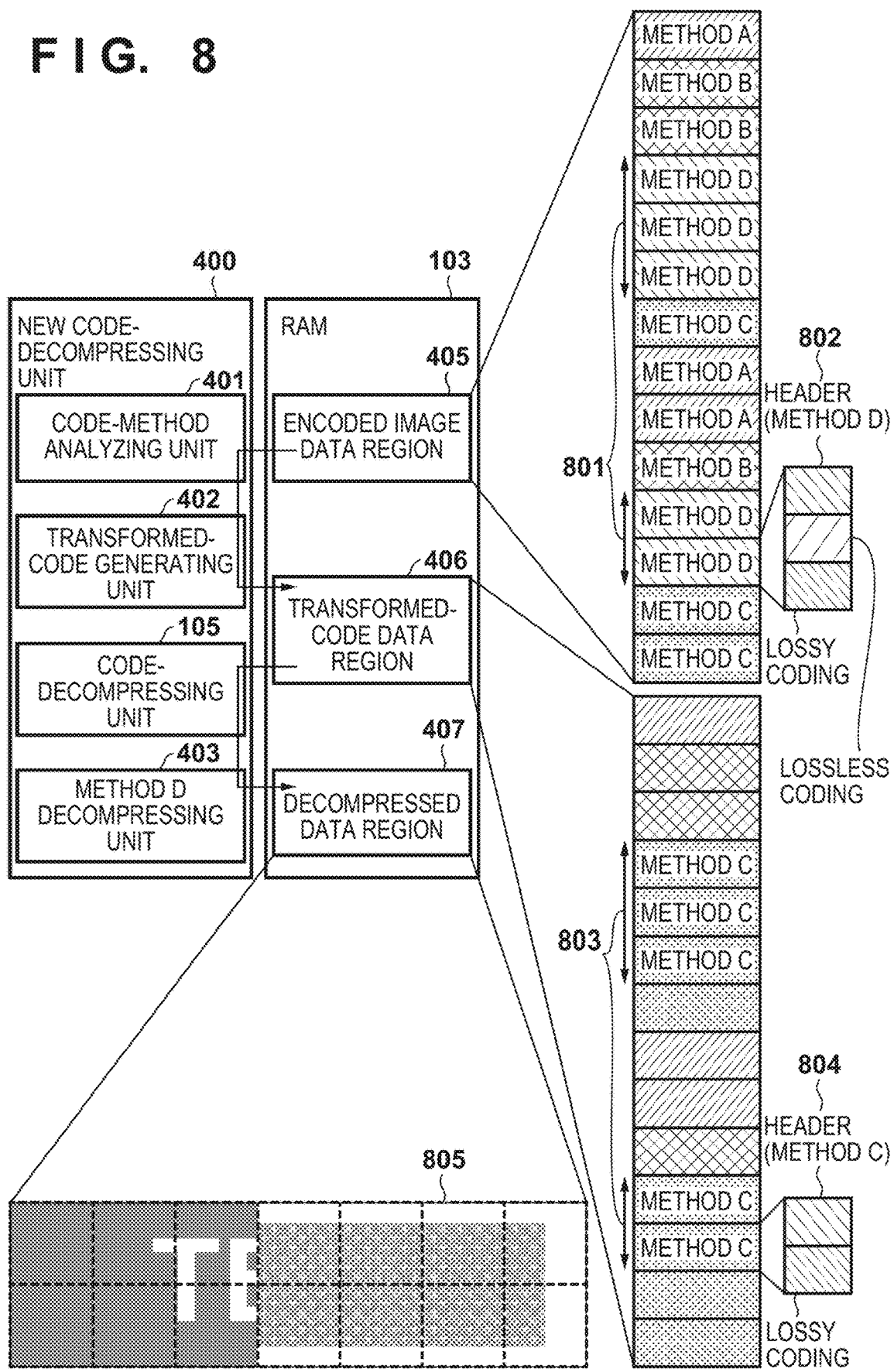
FIG. 8 is a view showing the processing of the new code-decompressing unit and the data structure in a RAM according to the second embodiment.

FIG. 7 is a flowchart showing the processing procedure of a new code-decompressing unit 400 according to the second embodiment. FIG. 8 shows data storage states in regions 405 to 407 in a RAM 103 according to the second embodiment.

When encoded data received from the outside is stored in the encoded image data region 405 of the RAM 103, the processing starts.

First, in step S701, a new code-decompressing unit 400 controls a code-method analyzing unit 401 and causes it to analyze the header of one block (to be referred to as a block of interest hereinafter) from the encoded image data region 405 and determine the code method of the block. Next, in step S702, the new code-decompressing unit 400 determines whether the determined code method is a code method (the methods A to C) that enables decompression by the code-decompressing unit 105. In other words, the new code-decompressing unit 400 determines whether the code-decompressing unit 105 according to the embodiment supports decompression of the block of interest or not. Upon determining that the method enables decompression by the code-decompressing unit 105, the new code-decompressing unit 400 advances the process to step S703 to directly copy the encoded data (including the block header) of the block of interest and save it in the transformed-code data region 406.

Upon determining that the encoded data of the block of interest uses the method (method D) that does not enable decompression by the code-decompressing unit 105, the new code-decompressing unit 400 advances the process to step S704. In step S704, the new code-decompressing unit 400 controls a transformed-code generating unit 402 and causes it to transform the encoded data of the block of interest into encoded data that can be decompressed by the code-decompressing unit 105. The encoded data transformation method in step S704 according to this embodiment will be described with reference to FIG. 8.

Reference numeral 801 in FIG. 8 denotes encoded data of a block encoded by the hybrid type code method D, which is detected by the code-method analyzing unit 401 and cannot be decompressed by the code-decompressing unit 105. Reference numeral 802 denotes a data structure of the hybrid type code method D. The data structure 802 is formed by a header, lossless encoded data, and lossily encoded data. The header is data assigned to encoded data of each encoding unit, and it is possible to know the code method with which the encoded data is encoded. Since the code method D is a hybrid type code method including the method B using lossless coding and the method C using lossy coding, the data structures of the lossless coding and the lossy coding are the same as those of the methods B and C, respectively.

Reference numeral 803 denotes encoded data of the method C using lossy coding, which is transformed by the transformed-code generating unit. Reference numeral 804 denotes a data structure of the method C including a header and lossily encoded data.

The transformed-code generating unit 402 deletes the lossless encoded data from the encoded data of the method D to leave only the lossily encoded data and rewrites the header to the method C, thereby changing the lossy portion of the method D to the method C. The transformed-code generating unit 402 then saves the change result, that is, the encoded data of the method C in the transformed-code data region 406.

In this embodiment, the lossless encoded data is deleted to leave only the lossily encoded data. Instead, lossily encoded data may be deleted to leave only the lossless encoded data. In addition, in a case in which the code-decompressing unit 105 can neglect the lossless or lossily encoded data whose decompression is disabled by rewriting the header, only the header may be rewritten without performing deletion.

In step S705, the new code-decompressing unit 400 determines whether the determination processing is ended for all blocks. If NO, the process returns to step S701.

Upon determining in step S705 that the determination processing of all blocks is ended, significant encoded data for all blocks, which can be decompressed by the code-decompressing unit 105, are stored in the transformed-code data region 406 of the RAM 103.

Hence, in step S706, the new code-decompressing unit 400 controls the code-decompressing unit 105 and causes it to execute decompression processing of the encoded data stored in the transformed-code data region 406 of the RAM 103 and store the image data of the decompression result in the decompressed data region 407.

Reference numeral 805 in FIG. 8 shows an example of output of decompressed data stored in the decompressed data region 407 at the time of completion of the processing in step S706. At this point of time, only the natural image of the background portion represented by the lossily encoded data of the method D in the encoded image data region 405 is decompressed.

When the decompression processing is ended, the new code-decompressing unit 400 advances the process to step S707 and controls the method D decompressing unit 403 to receive the information of the encoded data of the method D in the encoded image data region 405 and perform software decoding of the encoded data. In this embodiment, the portion of the lossily encoded data is already decompressed by the code-decompressing unit 105. Hence, the method D decompressing unit 403 combines image data obtained by decoding the portion of the lossless encoded data of the code method D at a corresponding position of the decompressed data region 407.

As described above, according to the second embodiment, encoded data of a new code method, which cannot be decompressed by an existing code-decompressing apparatus, is transformed and processed as a conventional code method, thereby allowing the existing code-decompressing apparatus to perform part of the decompression processing of the new code method. Accordingly, data encoded by the newly developed code method can be decompressed at a high speed.

Note that in the above-described second embodiment, the method D represents a mixture of encoded data of two types of code methods. However, the number of types is not limited to two, and a plurality of types need only coexist.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-174190, filed Sep. 18, 2018, which is hereby incorporated by reference herein in its entirety.

What is claimed is:

1. An image decompressing apparatus for decompressing encoded image data, the apparatus comprising:
a first decompressing unit configured to decompress encoded data of a preset type on a block basis;
a second decompressing unit configured to decompress encoded data of a block in which encoded data of a plurality of types coexist;
an identifying unit configured to identify a type of encoded data for each block of input encoded image data;
a generating unit configured to,
in a case in which a type of encoded data of a block of interest identified by the identifying unit is a single type that can be decompressed by the first decompressing unit, store the encoded data of the block of interest in a predetermined memory, and
in a case in which encoded data of a plurality of types that cannot be decompressed by the first decompressing unit are included, store encoded data of a single type in the encoded data of the block of interest, which can be decompressed by the first decompressing unit, in the predetermined memory as the encoded data of the block of interest, thereby generating encoded image data that can be decompressed by the first decompressing unit; and a control unit configured to control the first decompressing unit to decompress the encoded data generated by the generating unit and generate tentative image data, then controls the second decompressing unit to decompress the encoded data of a remaining type that cannot be decompressed by the first decompressing unit, and update the tentative image data to the decompression result, thereby generating image data to be output.

2. The apparatus according to claim 1, wherein the first decompressing unit comprises hardware, and the second decompressing unit comprises software.

3. The apparatus according to claim 1, wherein the second decompressing unit decompresses encoded data in which two types of encoded data including lossless encoded data and lossily encoded data coexist.

4. The apparatus according to claim 1, further comprising a printing unit configured to print in accordance with the image data obtained by the control unit.

5. The apparatus according to claim 3, wherein the lossless encoded data is run length coded data.

6. The apparatus according to claim 3, wherein the lossily encoded data is JPEG coded data.

7. The apparatus according to claim 1, wherein the identifying unit identifies the type of the encoded data based on information of a header of the input encoded data.

8. The apparatus according to claim 1, wherein, in the case in which the encoded data of the plurality of types that cannot be decompressed by the first decompressing unit are included, the generating unit deletes at least one of the encoded data of the plurality of types, thereby storing the encoded data of the single type in the encoded data of the block of interest, which can be decompressed by the first decompressing unit, in the predetermined memory as the encoded data of the block of interest.

9. The apparatus according to claim 1, wherein, in the case in which the encoded data of the plurality of types that cannot be decompressed by the first decompressing unit are included, the generating unit stores the encoded data of the single type in the encoded data of the block of interest, which can be decompressed by the first decompressing unit, in the predetermined memory as the encoded data of the block of interest, and changes information of a header of the input encoded data.

10. The apparatus according to claim 1, further comprising a determination unit configured to determine whether all blocks included in the encoded image data are identified by the identifying unit.

11. A control method of an image decompressing apparatus for decompressing encoded image data, the method comprising:

a first decompressing step of decompressing encoded data of a preset type on a block basis;

a second decompressing step of decompressing encoded data of a block in which encoded data of a plurality of types coexist;

an identifying step of identifying a type of encoded data for each block of input encoded image data;

a generating step of,
in a case in which a type of encoded data of a block of interest identified in the identifying step is a single type that can be decompressed in the first decompressing step, storing the encoded data of the block of interest in a predetermined memory, and in a case in which encoded data of a plurality of types that cannot be decompressed in the first decompressing step are included, storing encoded data of a single type in the encoded data of the block of interest, which can be decompressed in the first decompressing step, in the predetermined memory as the encoded data of the block of interest, thereby generating encoded image data that can be decompressed in the first decompressing; and controlling the first decompressing step to decompress the encoded data generated in the generating step to generate tentative image data, then controlling the second decompressing step to decompress the encoded data of a remaining type that cannot be decompressed in the first decompressing step, and updating the tentative image data to the decompression result, thereby generating image data to be output.

12. The method according to claim 11, wherein the second decompressing step decompresses encoded data in which two types of encoded data including lossless encoded data and lossily encoded data coexist.

13. The method according to claim 12, wherein the lossless encoded data is run length coded data.

14. The method according to claim 12, wherein the lossily encoded data is JPEG coded data.

15. The method according to claim 11, wherein the identifying step identifies the type of the encoded data based on information of a header of the input encoded data.

16. The method according to claim 11, wherein, in the case in which the encoded data of the plurality of types that cannot be decompressed by the first decompressing step are included, the generating step deletes at least one of the encoded data of the plurality of types, thereby storing the encoded data of the single type in the encoded data of the block of interest, which can be decompressed by the first decompressing step, in the predetermined memory as the encoded data of the block of interest.

17. The method according to claim 11, wherein, in the case in which the encoded data of the plurality of types that cannot be decompressed by the first decompressing step are included, the generating step stores the encoded data of the single type in the encoded data of the block of interest, which can be decompressed by the first decompressing step, in the predetermined memory as the encoded data of the block of interest, and changes information of a header of the input encoded data.

18. The method according to claim 11, further comprising a determining step of determining whether all blocks included in the encoded image data are identified in the identifying step.

19. An image decompressing apparatus for decompressing encoded image data, the apparatus comprising:

a first decompressing unit configured to decompress encoded data of a preset type;

a second decompressing unit configured to perform decompression processing of encoded data of a type that the first decompressing unit does not support;

an identifying unit configured to identify a type of encoded data for each block of input encoded image data;

a generating unit configured to,
in a case in which a type of encoded data of a block of interest identified by the identifying unit is a type that can be decompressed by the first decompressing unit, store the encoded data of the block of interest in a predetermined memory, and in a case in which the type is a type that cannot be decompressed by the first decompressing unit, store predetermined encoded data that can be decompressed by the first decompressing unit in the predetermined memory, thereby generating encoded image data that can be decompressed by the first decompressing unit; and a control unit configured to control the first decompressing unit to decompress the encoded data generated by the generating unit to generate tentative image data, and then controlling the second decompressing unit to decompress the encoded data that cannot be decompressed by the first decompressing unit, and update the tentative image data to the decompression result, thereby generating image data to be output.

20. A control method of an image decompressing apparatus for decompressing encoded image data, the method comprising:

a first decompressing step of decompressing encoded data of a preset type;

a second decompressing step of performing decompression processing of encoded data of a type that the decompressing does not support;

an identifying step of identifying a type of encoded data for each block of input encoded image data;

a generating step of,
in a case in which a type of encoded data of a block of interest identified in the identifying step is a type that can be decompressed in the first decompressing step, storing the encoded data of the block of interest in a predetermined memory, and in a case in which the type is a type that cannot be decompressed in the first decompressing step, storing predetermined encoded data that can be decompressed in the first decompressing step in the predetermined memory, thereby generating encoded image data that can be decompressed in the first decompressing step; and a controlling step of controlling the decompressing to decompress the encoded data generated in the first generating step to generate tentative image data, and then controlling the second decompression step to decompress the encoded data that cannot be decompressed in the first decompressing step, and update the tentative image data to the decompression result, thereby generating image data to be output.

21. A non-transitory computer-readable storage medium storing a program which, when read and executed by a computer, causes the computer to execute the steps of a control method of an image decompressing apparatus for decompressing encoded image data, the method comprising:

a first decompressing step of decompressing encoded data of a preset type;

a second decompressing step of performing decompression processing of encoded data of a type that the decompressing does not support;

an identifying step of identifying a type of encoded data for each block of input encoded image data;

a generating step of,
in a case in which a type of encoded data of a block of interest identified in the identifying step is a type that can be decompressed in the first decompressing step, storing the encoded data of the block of interest in a predetermined memory, and in a case in which the type is a type that cannot be decompressed in the first decompressing step, storing predetermined encoded data that can be decompressed in the first decompressing step in the predetermined memory, thereby generating encoded image data that can be decompressed in the first decompressing step; and a controlling step of controlling the decompressing to decompress the encoded data generated in the first generating step to generate tentative image data, and then controlling the second decompression step to decompress the encoded data that cannot be decompressed in the first decompressing step, and update the tentative image data to the decompression result, thereby generating image data to be output.

22. A non-transitory computer-readable storage medium storing a program which, when read and executed by a computer, causes the computer to execute the steps of a control method of an image decompressing apparatus for decompressing encoded image data, the method comprising:

a first decompressing step of decompressing encoded data of a preset type on a block basis;

a second decompressing step of decompressing encoded data of a block in which encoded data of a plurality of types coexist;

an identifying step of identifying a type of encoded data for each block of input encoded image data;

a generating step of,
in a case in which a type of encoded data of a block of interest identified in the identifying step is a single type that can be decompressed in the first decompressing step, storing the encoded data of the block of interest in a predetermined memory, and in a case in which encoded data of a plurality of types that cannot be decompressed in the first decompressing step are included, storing encoded data of a single type in the encoded data of the block of interest, which can be decompressed in the first decompressing step, in the predetermined memory as the encoded data of the block of interest, thereby generating encoded image data that can be decompressed in the first decompressing; and controlling the first decompressing step to decompress the encoded data generated in the generating step to generate tentative image data, then controlling the second decompressing step to decompress the encoded data of a remaining type that cannot be decompressed in the first decompressing step, and updating the tentative image data to the decompression result, thereby generating image data to be output.

* * * * *